Jan. 15, 1957
M. L. WEAVER ET AL
2,777,933
BRANDING IMPLEMENTS
Filed Dec. 15, 1953
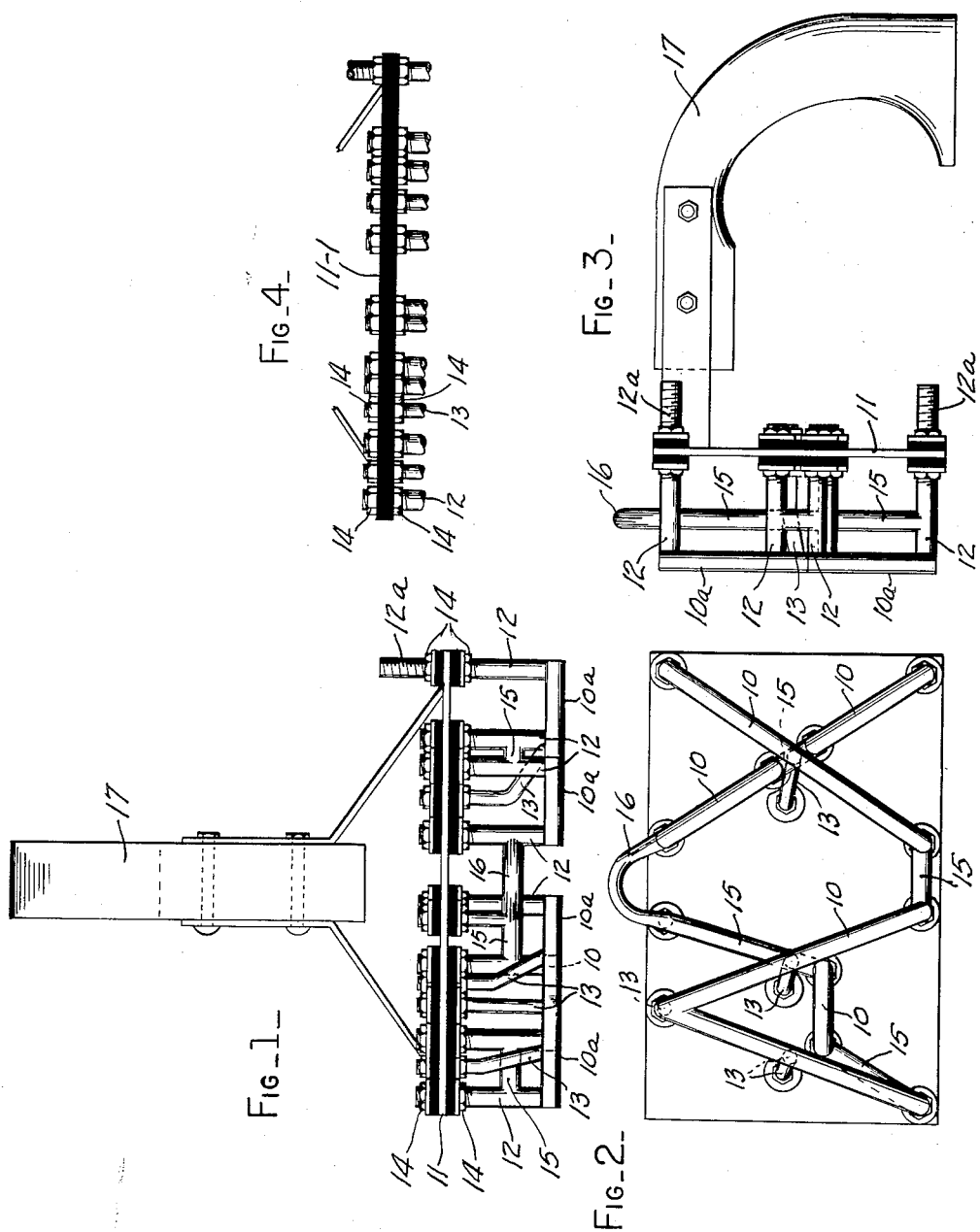
INVENTORS
MARK L. WEAVER
WRIGHT WEAVER
BY
ATTORNEYS

United States Patent Office 2,777,933
Patented Jan. 15, 1957

2,777,933

BRANDING IMPLEMENTS

Mark L. Weaver, Salt Lake City, Utah, and Wright Weaver, Idaho Falls, Idaho, assignors to Weavers' Electric Brand, Salt Lake City, Utah, a corporation of Utah Application December 15, 1953, Serial No. 398,297

7 Claims. (Cl. 219—30)

This invention relates to branding implements for burning identification marks or brands on the hides of living animals, particularly horses and cattle, such implements being commonly referred to as branding irons. It relates particularly to electrical branding irons.

The present application is a continuation-in-part of our application Serial No. 248,474, filed September 27, 1951, now abandoned.

Branding irons for livestock have for many years been of a type requiring heating in fires built and maintained at the scene of the branding.

It has been quite obvious that a branding iron adapted for heating by electricity would be a great convenience, and attempts have been made heretofore to produce an acceptable construction. The task has, however, not proven so simple as might have been expected.

Electrical branding irons heretofore constructed have been very slow to attain branding heat, generally requiring from twenty to thirty minutes. Even after branding heat has been reached, it has been difficult to maintain such heat where the weather is cold or windy or in instances where the animals are wet and cold. Furthermore, it has not been found practical to disconnect the iron from the source of power and brand with the disconnected implement where conditions make it impractical to brand otherwise. Accordingly, electrical branding irons produced heretofore have not been practical for general use by the livestock industry, and have been particularly unacceptable in large areas of the western part of the United States where inclement weather often prevails.

A principal object of the present invention is to provide an electrical branding iron which will attain branding heat extremely rapidly, that is to say, in a matter of seconds rather than minutes; and one which will effectively maintain branding heat under any and all circumstances of use.

Additional outstanding objects are to attain the above advantages in an electrical branding iron adapted to be operated at a voltage so low as to not be a hazard to either operator or animal under any circumstances, and which will attain and maintain its branding heat substantially uniformly over its entire branding face.

Other objects are to provide an electrical branding iron that will be capable of holding branding heat for relatively long intervals of time between periods of heating, so that it may be effectively used to brand several animals in succession when and even though detached from its source of power; to provide such a branding implement which will penetrate deeply, making it possible to reach an animal's hide through long heavy hair; to provide an implement of this character giving full visibility of the brand surface, so as to enable the operator to reset the implement in the same burn in case the first application is not sufficient; to provide rigid but adjustable support for the branding elements, so as to preclude warping and bending of the hot iron under branding pressure, but enabling simple and convenient correction of any warping which may occur due to rough handling or otherwise; to effectively space the individual branding elements from a supporting base, so that heat will be dissipated except as it occurs in the branding elements themselves; to effect uniform heating of the individual branding elements by a construction which aids in structurally supporting them; and to provide an implement for branding purposes which is equipped with a touch-up tip, by which depressed surfaces, such as between the ribs, etc., may be reached where they would otherwise be inaccessible to the flat surface of the tool.

In attaining the objects and purposes of the invention, we utilize bars of high resistance material, such as stainless steel, for the branding elements, and connect the individual bars in electrical series by means of members made of material having relatively low resistance, such branding elements and electrical connection members having cross sectional area sufficiently great to produce a very low resistance circuit which is well adapted for low potential drop and high current, as will be explained in greater detail hereinafter.

Structural features significant with respect to the above reside in the mounting of the individual branding bars in heat-dissipating, spaced relationship relative to a base by means of supporting legs which at least partially serve as electrical connection or conductor members, and in adjustably anchoring these legs in the base, so that the extent of projection thereof may be individually varied in compensating for any warping or accidental displacement of the branding elements relative to one another that may possibly occur during use or handling of the implement.

Additional structural features are the utilization of the electrical connection or conductor members as structural reinforcement for the individual legs and for the branding structure as a whole, while limiting the effective length of the series circuit; and the provision of heat conductive supporting legs for such branding elements as may be of excessive length, thereby insuring substantially uniform heating throughout the entire length.

Additional objects and features will become apparent from the following detailed description of the preferred specific constructions illustrated in the accompanying drawing to exemplify the structural concepts of the invention.

In the drawing:

Fig. 1 represents a front elevation of the branding implement;

Fig. 2, a bottom plane view looking directly into the brand-applying face of the implement, which is pressed against the hide of an animal to be branded;

Fig. 3, a side elevation looking from the right with respect to Fig. 2; and

Fig. 4, a fragmentary view corresponding to that of Fig. 1, but illustrating a somewhat different construction.

Referring now to the drawing:

In any given instance, the implement is fabricated to produce a specified form of brand, and, in the illustrated embodiments, the brand consists of the letters A X, formed by individual branding elements 10.

The branding elements 10 are of various lengths conforming to the requirements of the letters or other indicia which they form. They are each of bar formation, and of material having high electrical resistance. Stainless steel is a preferred material, and one of the several well-known Nichrome alloys is particularly preferred.

These bar branding elements 10 are of such extensive cross sectional area as will make for relatively low resistance to current flow therethrough when connected in a series electrical circuit as hereinafter described. We have had especially satisfactory results when using round bar stock from one quarter to nine thirty seconds of an inch in diameter, depending upon the width of burn desired. Where wider burns are desired, the shape of the specified bar stock may be altered by a suitable deforming procedure, such as rolling. Thus, the cross-sectional area of the bar stock is approximately 0.0472 square inch.

The several branding elements 10 are arranged with their respective branding faces 10a lying in a common plane, as indicated in Figs. 1 and 3, and are individually supported on and in spaced relationship to a base 11 by means of electric conductor legs 12, and, in certain instances, also by means of heat conductive legs 13.

The base 11 is advantageously of plate formation extending at least coextensively with the brand, so as to provide adequate supporting area without crowding. It is electrically insulative with respect to the several legs 12 and 13, either by means of respective insulator inserts 14, or preferably by making the entire plate from an asbestos fiber composition board as indicated 11—1 in the embodiment of Fig. 4.

The several legs 12 and 13 are sufficiently long to space the branding elements 10 from the base 11 for heat-dissipating ventilation, so that there will be no concentration of heat except in the branding elements. In practice, the legs are ordinarily made at least an inch in length, and preferably two inches or even greater. The minimum spacing in any given instance will depend upon the size of the brand and the extent to which it generates heat. Adjustable anchoring of the legs with respect to the plate is individually attained by threading the anchor ends of the respective legs, and by passing such ends through receiving holes in the plate and utilizing nuts 14 at opposite faces of the plate to clamp the respective legs securely to the base. This is a particularly simple and effective way of attaching the legs to the base plate for individual adjustment to correct any warping or other displacement of the brand-applying faces 10a of the branding elements from the common plane in which they normally lie.

There is a pair of legs 12 for each of the individual branding elements 10, such legs being united to respective opposite ends of the branding element in a good electrical joinder, advantageously by welding. For this reason, it is highly desirable that the legs 12 be of a conductive material which can be effectively welded to the high resistance material of the branding elements. We find mild steel or iron to be satisfactory for this purpose.

The heat-conductive legs 13 may also be of mild steel or iron welded to the particular branding element or elements concerned. They are used only in instances where the branding element is of exceptional length, here shown by the inverted V-formation of Fig. 2 which makes up the greater part of the A, and by the one long cross member of the X. These heat-conductive legs make it possible to establish and maintain uniform heating throughout the length of the excessively long bar element, the heat which is conducted away from the bar element being dissipated in the ventilating space between the brand proper and the supporting base. Where necesary, such legs 13 may be bent to avoid other structure, as shown.

The several legs 12 are interconnected by electrical conductor members 15 to form a series electrical circuit, two of such legs being utilized as electric terminals, such two legs being here shown as provided with respective extensions 12a at their threaded, anchor ends to serve as binding posts.

In order to shorten the length of the series circuit and to reduce the resistance encountered by the current in non-heater parts of the circuit, that is to say, in the legs 12, the electrical conductor members 15 are placed intermediate the lengths of such legs 12, being spaced a sufficient distance from the branding elements 10 to minimize contact therewith of hair from the animal's hide. For the same reason, these electrical conductor members 15 are of good electrically conductive material, preferably brass. They are brazed to the legs 12, and those portions of the legs 12 which extend outwardly therefrom to union with the branding elements are preferably coated, as by brazing, with brass to increase their electrical conductivity.

The intermediate placement of the electrical conductor members 15 has an additional advantage of providing effective structural bracing for the individual legs 12 and for the brand as a whole.

The electrical conductor members 15 may be conveniently of the same or similar cross sectional area as the legs 12, both larger or being of the same or similar cross sectional area as the branding elements 10. The important thing here is to attain requisite structural strength with proper electrical characteristics.

A useful appendage is provided by an arched branding bar member 16 electrically united to either adjacent conductor members 15, adjacent legs 12, or to both, as here shown, and projecting laterally of the implement beyond the base as a touch-up tip for extending into hard-to-reach places, as, for example, between the ribs of an animal. It is preferably made of the same material as the branding elements 10, and preferably has a similar cross sectional area.

The implement as so far described may be provided with any suitable handle for convenient manipulation, the grip 17 illustrated being merely one convenient arrangement.

The implement of this invention is a low resistance unit for use with a low voltage power source, and draws an especially high current. As connected in a power circuit of from one to ten volts, which is the preferred range, it will draw a current of from forty to four hundred amperes. The resistance of the circuit will ordinarily be a small fraction of an ohm, and for satisfactory results, the resistance characteristics of the implement should not be such as to, in any instance, produce a circuit resistance of over one ohm.

While, in some instances, a power source higher than ten volts may be usefully employed, it is not desirable to use a source higher than forty volts.

In order to obtain substantially absolute uniformity of heating of the branding elements, it will be necessary and is usually advisable to somewhat reduce or somewhat increase the cross sectional area of the branding elements at various locations along their lengths, depending upon the over-all lengths of the individual elements and the spacing of any heat conductive supporting legs which may be provided. This can be effectively accomplished by filing away portions and by welding on additional portions, meanwhile testing for uniformity of heat either visually or by instrument.

Whereas this invention is here illustrated and described with respect to preferred specific constructions, it is to be understood that various changes may be made within the scope of the claims which here follow.

We claim:

1. In an electrical branding iron for livestock, the combination of a plurality of individual branding elements in the form of respective electrical resistance bars having brand-applying faces and such extensive cross-sectional area as will make for relatively low resistance to current flow therethrough, said branding elements being arranged with their brand-applying faces lying in a common plane and in the form of a given brand; a base member; a plurality of elongate supporting legs securely mounting said branding elements on said base member in heat-dissipating spaced relationship thereto, said plurality of legs including legs of relatively good electrical conductivity united with and supporting respectively opposite ends of the respective branding elements; and electrical conductors located intermediate the lengths of said legs and electrically interconnecting said legs in series, leaving a pair of said legs as terminals for connection with a source of electricity, the said base member being electrically insulated with respect to said legs.

2. The combination recited in claim 1, wherein the portions of the respective legs extending between the electrical conductors and the branding elements are coated with a material which increases the electrical conductivity.

3. The combination recited in claim 2, wherein the branding elements are bars of stainless steel, the legs are of a metal of relatively good electrical conductivity welded to the stainless steel, and the electrical conductors are of brass and brazed to the legs.

4. The combination recited in claim 4, wherein the base member is of plate formation, and each leg has a threaded end fastened through the plate; and wherein said legs are adjustably anchored by means of respective sets of nuts on said threaded ends of the legs at opposite faces of the plate.

5. The combination recited in claim 1, wherein the plurality of individual branding elements include at least one branding element of exceptional length; and wherein the said plurality of supporting legs includes at least one leg of heat-conductive material intermediate the length of the said branding element of exceptional length, said heat-conductive leg having no electrical connection with any of the said electrical conductors.

6. A branding implement comprising a flat base plate, a plurality of branding bars of high resistance arranged in a common plane in the form of a brand mark, terminal upstanding legs of high conductivity united with the bars and extending through insulators in the base plate, nuts threadingly engaged with the legs both above and below the base plate and bearing on the insulators, bars of high conductivity connecting certain of the legs in a plane between the branding bars and the base plate to electrically connect all of the bars and legs in series, two of the legs being extended well above the base plate to constitute binding posts, and a hand grip carried by the base plate on the opposite face from the bars, one of the bars being in the form of an arched high resistance conductor cross-sectionally like the branding bars and having the arched portion projecting laterally beyond the edge of the base plate to function as a touch-up tip.

7. In an electrical branding iron for livestock, the combination of a plurality of individual branding elements in the form of respective electrical resistance bars having brand-applying faces and cross-sectional area of approximately 0.0472 square inch, making for relatively low resistance to current flow therethrough, said branding elements being arranged with their brand-applying faces lying in a common plane and in the form of a given brand; a base member; a plurality of elongate supporting legs securely mounting said branding elements on said base member in heat-dissipating spaced relationship thereto, said plurality of legs including legs of relatively good electrical conductivity united with and supporting respectively opposite ends of the respective branding elements; and electrical conductors electrically interconnecting said legs in series, leaving a pair of said legs as terminals for connection with a source of electricity, the said base member being electrically insulated with respect to said legs.

References Cited in the file of this patent

UNITED STATES PATENTS

| 1,323,504 | Turner | Dec. 2, 1919 |
| 2,514,618 | Ancell | July 11, 1950 |

FOREIGN PATENTS

| 20,304 | Great Britain | Dec. 12, 1890 |

OTHER REFERENCES

Johnson: "Grounding Resistors of Stainless Steel," The Electrical Journal, pp. 465–466, December 1938, pp. 465–466 cited.